(12) United States Patent
Yacobi et al.

(10) Patent No.: US 8,467,794 B2
(45) Date of Patent: Jun. 18, 2013

(54) METHOD AND SYSTEM FOR INTERNATIONAL DIALING OVER A CDMA AIR INTERFACE

(75) Inventors: Eitan Yacobi, Zichron-Ya'akov (IL); Thadi M. Nagaraj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 646 days.

(21) Appl. No.: 11/254,989

(22) Filed: Oct. 19, 2005

(65) Prior Publication Data

US 2007/0087754 A1    Apr. 19, 2007

(51) Int. Cl.
*H04W 40/00* (2009.01)
*H04M 11/00* (2006.01)

(52) U.S. Cl.
USPC .......................................... 455/445; 455/421

(58) Field of Classification Search
USPC ......................................................... 455/421
See application file for complete search history.

(56) References Cited

U.S. PATENT DOCUMENTS

| | | | | |
|---|---|---|---|---|
| 6,714,799 | B1 * | 3/2004 | Park et al. ...................... | 455/558 |
| 2003/0165226 | A1 * | 9/2003 | Vu et al. ..................... | 379/221.01 |
| 2004/0018857 | A1 * | 1/2004 | Asokan et al. ................. | 455/564 |
| 2005/0032527 | A1 * | 2/2005 | Sheha et al. ............... | 455/456.1 |
| 2005/0075077 | A1 * | 4/2005 | Mach et al. ................. | 455/67.13 |
| 2006/0068786 | A1 * | 3/2006 | Florence .................... | 455/435.2 |

FOREIGN PATENT DOCUMENTS

| | | |
|---|---|---|
| EP | 0526832 A2 | 2/1993 |
| JP | 10117377 | 5/1998 |
| JP | 2005184650 | 7/2005 |
| JP | 2008523770 | 7/2008 |
| KR | 1020050074943 | 7/2005 |
| KR | 20060075585 | 7/2006 |
| WO | WO2004054310 | 6/2004 |
| WO | WO2005050956 | 6/2005 |

OTHER PUBLICATIONS

International Search Report, PCT/US2006/060089, International Searching Authority, European Patent Office, Mar. 22, 2007.
Written Opinion, PCT/US2006/060089, International Searching Authority, European Patent Office, Mar. 22, 2007.
International Preliminary Report on Patentability, PCT/US2006/060089, The International Bureau of WIPO, Geneva, Switzerland, Apr. 23, 2008.

* cited by examiner

*Primary Examiner* — Temica M Beamer
*Assistant Examiner* — Joel Ajayi
(74) *Attorney, Agent, or Firm* — Florin C. Corie; Abdollah Katbab

(57) ABSTRACT

A telecommunications system is described that includes a first interface configured to receive a first call message according to a CDMA air interface format. This system also includes a message translator configured to determine if the first call message includes an indicator associated with an international telephone call and, if so, is further configured to generate a second call message that includes an international prefix. Also included is a second interface configured to transmit the second call message having a particular core network format.

47 Claims, 5 Drawing Sheets

METHOD AND SYSTEM FOR INTERNATIONAL DIALING OVER A CDMA AIR INTERFACE

BACKGROUND

1. Field

The present disclosure relates generally to telecommunications, and more particularly, to telecommunications involving international dialing

2. Background

Consumer demand for wireless services has led to the development of numerous wireless communication networks. One such network is based on code division multiple access (CDMA) technology which supports wireless voice and data services using spread-spectrum techniques. Spread-spectrum techniques enable high quality service at low cost by efficiently using the available radio frequency (RF) spectrum. As a result, CDMA technology is considered by most to be the next generation of digital wireless communications.

To provide the widest availability of CDMA technology, cost reduction efforts should be employed during implementation. One way to reduce costs is to implement CDMA as an overlay to existing networks such as a Global System for Mobile Communications (GSM). GSM, which has become the de facto standard in Europe and Asia, represents the previous generation of digital wireless communications and utilizes narrowband TDMA to support wireless voice and data services. By implementing CDMA as an overlay to GSM, or other existing systems, reduced cost may be realized because a substantial portion of the existing infrastructure may be used to support CDMA. Within the overlay architecture, the GSM system is augmented to include a CDMA air interface but retain the core GSM network. In operation, a mobile unit will communicate with a base transceiver station (BTS) via the CDMA air interface (instead of the GSM air interface) while the core network remains a conventional GSM network Implementing a CDMA network as an overlay to an existing infrastructure has various advantages. These include the ability to incrementally introduce CDMA service within a geographic region thereby spreading out the start up cost over time, as well as the ability to perform limited introductions of CDMA service only in areas where demand for wireless services has outgrown the capabilities of existing technology. Additional benefits include providing the performance advantages of the CDMA air interface while avoiding the cost and complexity of replacing the GSM core networks.

Roaming is the ability to make and receive calls outside of a user's home network. International roaming, more specifically, is the ability make and receive calls from a foreign country, using the user's own handset and the foreign country's wireless network. Typically, international roaming requires a user to dial an international access code, or an "international prefix" to reach a telephone number outside of the country where the user is located. International access codes are specific to each country and, in some cases, to the carrier whose network supports the call. For example, a user in the United States must dial "011" on his handset in order to use the international roaming feature to place an international call. A user in France would dial "00," "40," or "70," or another international prefix, depending on which carrier he chooses to utilize, in order to place an international call from France. Therefore, users who frequently travel must keep track of a variety of different international access codes, or prefix, in order to use their handsets to make phone calls in different countries. Because many countries have different international access codes, and because the international access codes within a single country can vary according to carrier, accurate knowledge of the codes can be a significant burden on travelers.

Many European countries utilize the Global System for Mobile Communications (GSM) standard for wireless networks. GSM supports an international dialing feature in which users may dial a (+) key on their handset in lieu of dialing the international prefix. Dialing the (+) key marks the call as an international call, instructing the local switching system to route the call to an international switch. Unfortunately, users whose handsets include the GSM-supported (+) key cannot utilize it in areas that are not covered by a GSM network. For example, code division multiple access (CDMA) air interfaces do not recognize or support such a (+) key functionality and are therefore unable to route a call including that key to an international switch. Instead, in order to route an international call, CDMA systems require the appropriate international prefix to accompany the call.

With the tremendous increase in wireless communications over the past years, there has been a demand for simpler access procedures when roaming internationally. However, there currently does not exist an automated international dialing feature allowing users to engage in international roaming, regardless of the network supporting the call, without knowing and entering the proper international prefix.

SUMMARY

Accordingly, one aspect described herein relates to a telecommunications system that includes a first interface configured to receive a first call message according to a CDMA air interface format. This system also includes a message translator configured to determine if the first call message includes an indicator associated with an international telephone call and, if so, is further configured to generate a second call message that includes an international prefix. Also included is a second interface configured to transmit the second call message having a core network format.

Another aspect relates to a mobile communications device that includes a user interface, the user interface including a particular input element that indicates an international telephone number, and the user interface configured to accept input related to a telephone number. The device further includes a message generator configured to generate a message according to the CDMA air interface based on the input, the message generator further configured to include an indicator within the message if the input includes the particular input element. Also included in the device is a transceiver further configured to transmit the message over a CDMA air interface.

Yet another aspect relates to a method for handling international calls. In accordance with this method, a first call origination message is received in a first format; then it is determined if the call origination message includes an indicator for an international telephone call. Once the determination is made, a second call origination message is generated in a second format, wherein the second call origination message includes an international prefix.

One further aspect relates to a mobile communications device that includes a memory configured to store a plurality of telephone numbers and a respective setting associated with each of the telephone numbers, the setting indicating whether the associated telephone number is an international telephone number. The device also includes a user interface configured to select one of the plurality of telephone numbers and a message generator configured to generate a message according to the CDMA air interface based on the selected one telephone number, the message generator further configured to include an indicator within the message if the setting indicates the selected one telephone number is an international telephone number. Also included in the device is a transceiver further configured to transmit the message over a CDMA air interface.

One more aspect relates to a method for initiating an international telephone call. In accordance with this method input related to a telephone number is received via a user interface as well as an input element that the telephone number is an international call. Also, a call origination message is generated that includes an indicator that the telephone number is an international call. The call origination message is formatted according to a CDMA air interface and is then transmitted.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Figure 1:
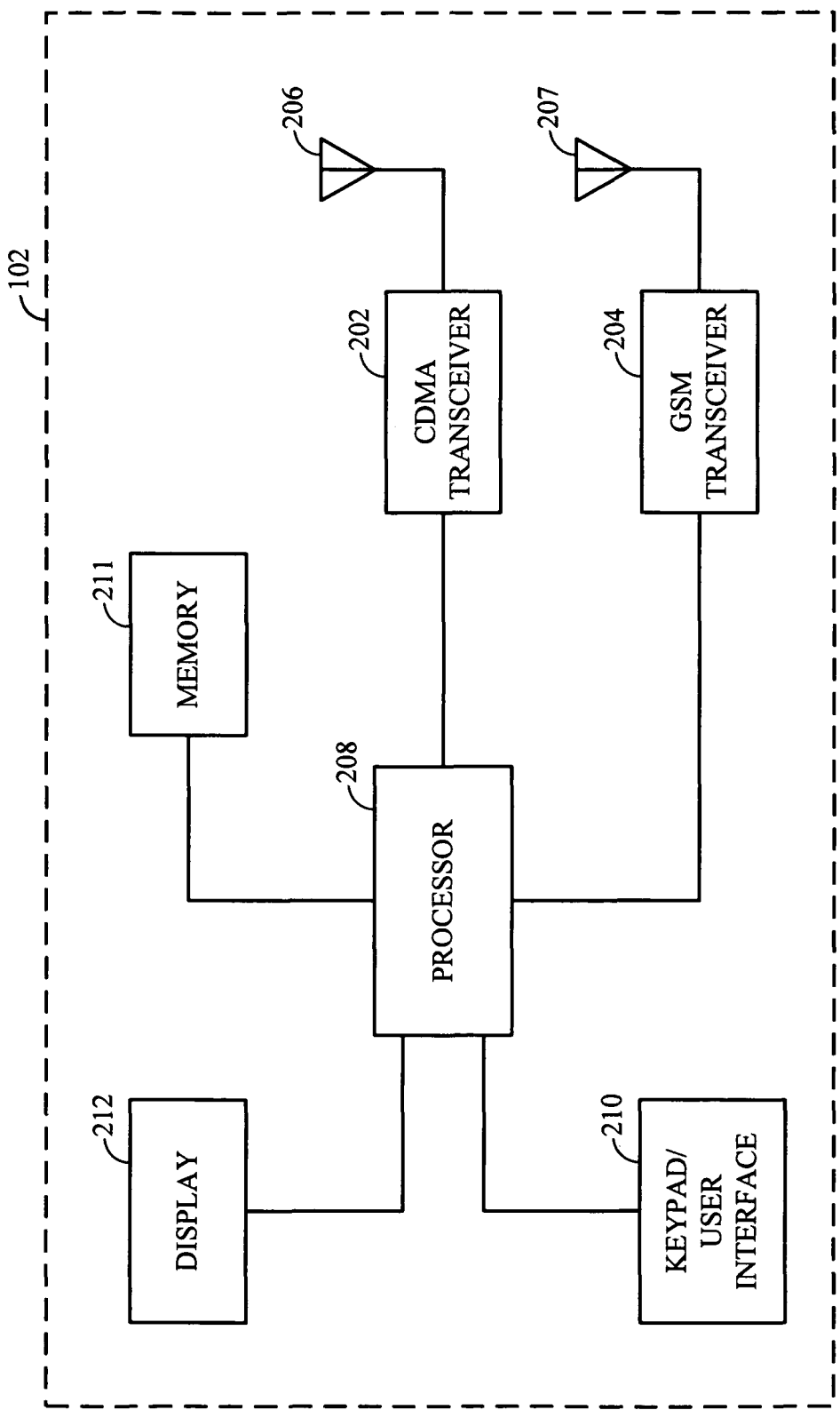
FIG. 1 illustrates a block diagram of a mobile communications device capable of communicating over a CDMA air interface.

FIG. 1 is a functional block diagram illustrating an example of a mobile device capable of supporting cellular communications. The mobile device 102 may include a first air interface transceiver 202 and a second air interface transceiver 204. For example, the transceivers may, respectively be compatible with a CDMA interface and a GSM interface. Therefore, in at least one embodiment of the mobile device 102, the cellular transceiver 202 is capable of supporting CDMA2000 1x communications with a BTS (not shown), and the other transceiver 204 is capable of supporting communications with a GSM BTS (not shown). Those skilled in the art will readily appreciate, however, that the concepts described in connection with the mobile device 102 can be extended to other cellular technologies, either alone or in combination with one another. In a the cellular mobile device 102, each transceiver 202, 204 may have a separate antenna 206, 207, respectively, as shown, but the transceivers 202, 204 could share a single broadband antenna. Each antenna 206, 207 may be implemented with one or more radiating elements.

The mobile device 102 is also shown with a processor 208 coupled to both transceivers 202, 204, however, a separate processor may be used for each transceiver in alternative embodiments of the mobile device 102. The processor 208 may be implemented as hardware, firmware, software, or any combination thereof. By way of example, the processor 208 may include a microprocessor or microcontroller (not shown) and will have access to a memory 211 that may be volatile, non-volatile or a combination thereof. The microprocessor may be used to support software applications that, among other things, (1) control and manage access to a cellular WAN, and (2) interface the processor 208 to the keypad 210, display, 212, and other user interfaces (not shown). The processor 208 may also include a digital signal processor (DSP) (not shown) with an embedded software layer that supports various signal processing functions, such as convolutional encoding, cyclic redundancy check (CRC) functions, modulation, and spread-spectrum processing. The DSP may also perform vocoder functions to support telephony applications. The processor 208 may be a stand-alone entity or distributed across multiple entities in the mobile device 102. The manner in which the processor 208 is implemented will depend on the particular application and the design constraints imposed on the overall system. Those skilled in the art will recognize the interchangeability of hardware, firmware, and software configurations under these circumstances, and how best to implement the described functionality for each particular application. The memory 211 may include a removable component such as, for example, a subscriber identity module (SIM) as a common in GSM mobile communications devices.

Figure 2:
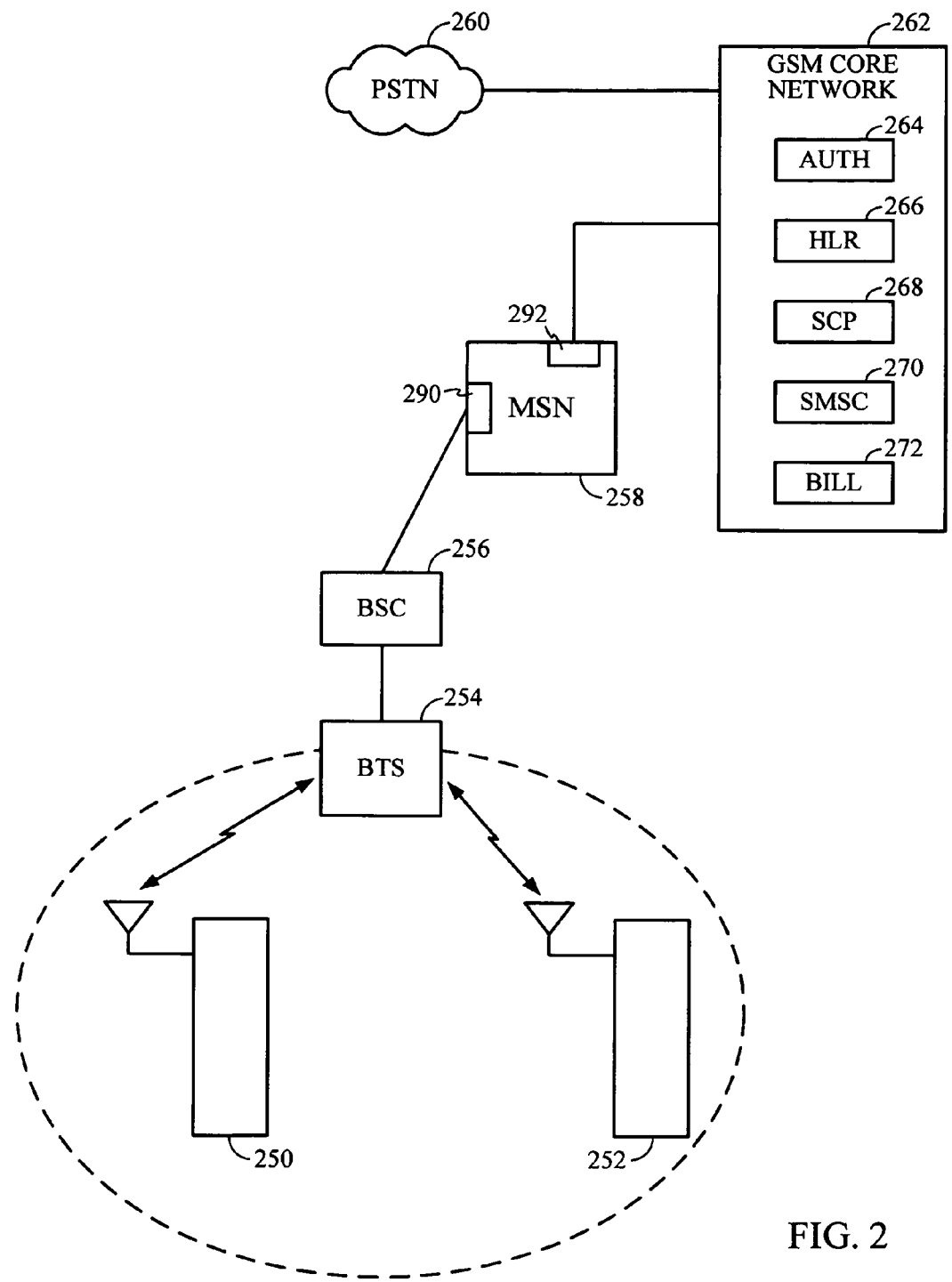
FIG. 2 illustrates an exemplary telecommunications network architecture including a core network different that its air interface.

The communications network architecture of FIG. 2 includes a core network and a radio access network. Another term used interchangeably with the radio access network is "the air interface". One example of such an architecture includes a GSM core network and a CDMA air interface. Such an architecture is described in more detail in United States Published Patent Application No. 20030227883 commonly assigned and incorporated herein by reference in its entirety.

Referring to FIG. 2, the core network 262 generally includes those elements on the "top" side of the mobile switching node (MSN) 258. The air interface generally refers to those elements "below" the MSN 258. The MSN 258 is capable of communicating to both the core network 262 and the radio access network (or air interface) by mapping messages in formats and structures in one cellular communication systems to formats and structures in the second cellular communication system. For example, if the core network is a GSM system, and the air interface is a CDMA system, the MSN 258 maps messages from formats and structures known in the GSM system to that known in a CDMA system, and vice-versa. Thus, the MSN conceptually includes two interfaces 290, 292. On interface 290 is configured to communicate in a format according to the air interface and the other interface 292 is configured to communicate according to the core network.

In general, as described in more detail in the above-referenced and incorporated published patent application, the MSN 258 may be a general purpose programmable computer or a more-specialized computer platform. Regardless of the specific hardware implementation of the MSN 258, a number of software applications or components are stored and executed thereon by one or more processors to perform the functionality described herein. Thus, the MSN 258 not only includes hardware components but also includes executable software applications and computer-readable media for storing such software.

Mobile stations 250 and 252 are wireless communication devices, such as a mobile telephone, a personal digital assistant, computer or other wireless device capable of wireless communication of voice or data information. Such a device, as explained with reference to FIG. 1 may include a memory such as a SIM card. The SIM card may be a standard GSM SIM card that is operable in a CDMA user terminal, capable of receiving and reacting to signals from base stations within both CDMA and GSM cellular systems. Such a GSM SIM card integrated with a CDMA handset is discussed in U.S. Provisional Patent Application No. 60/350,829, filed Jan. 17, 2002, and U.S. Provisional Patent Application No. 60/354,086, filed Feb. 1, 2002, both converted to U.S. patent application Ser. No. 10/076,831, filed Feb. 14, 2002, assigned to the same assignee as the present application, and is specifically incorporated in its entirety by reference herein. The SIM cards may also be a specialized SIM card configured to operate in more than one wireless communication system.

In one particular configuration, the mobile communications device 250 may be a multi-mode device such as the device 102 described with reference to FIG. 1. The other mobile communications device 252 may be different in that it includes only one transceiver and is capable of communicating over a single air interface. As is known the art, the devices 250, 252 communicate with one or more base transceiver stations (BTS) 254 that are connected to a base station controller (BSC) 256. The communications and message protocols and formats associated with the devices 250, 252 and the BTS 254 and BSC 256 describe the air interface over which communications take place.

Messages from the BSC 256 are directed to the MSN 258 which, as explained earlier, convert these messages into ones that are used to access the features and capabilities of the core network 262. For example, as is well known in a GSM core network, certain capabilities and features are used to enable telephone calls and data transmissions to occur using a public switched telephone network (PSTN) 260. These features include user authentication 264, a home location register 266, Service Control Point 268, messaging service 270, and user billing 272. Not only does the core network 262 receive messages and other data from the MSN 258 but it may also generate messages and other data for the BSC 256, BTS 254, and devices 250, 252. The MSN 258 acts as a translator for these messages as well so that they are appropriately formatted according to the operating air interface.

Figure 3:
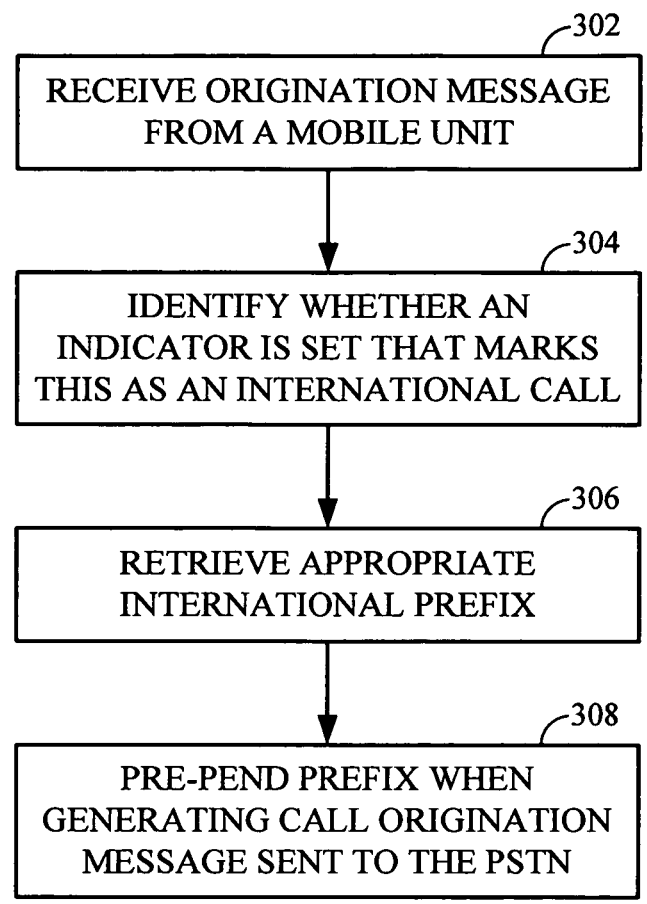
FIG. 3 depicts a flowchart of an exemplary method to connect international calls received from a mobile communications device over a CDMA air interface.

In the network architecture of FIG. 2, a user may place a telephone call from a mobile communications device 250 that is an international call that will eventually be directed to the PSTN 260 via the core network 262. In making such a call, the mobile communications device 250 (or 252) will generate an origination message formatted according to the air interface. This origination message is received by the BTS 254 and BSC 256 and directed to the MSN 258. The MSN 258 then translates, or converts, that origination message (formatted according to the air interface) into an origination message that is formatted according to the core network 262. Based on the origination message, the core network 262 initiates the connections with the PSTN 260 necessary to complete the requested call. FIG. 3 depicts a flowchart of an exemplary method for handling such an international call by the MSN 258.

In accordance with the method of FIG. 3, the MSN 258 receives, in step 302, a call origination message sent by a mobile communications device operating according to a first air interface. The message may in fact pass through one or more intermediary elements operating according to this air interface such as, for example, a BTS or BSC.

Once the origination message is received by the MSN, the MSN 258 identifies, in step 304, whether an indicator accompanying the message is set so as to indicate that the call is an international call. This indicator may be a flag or some other portion of the message that may be set to a particular value or setting. Furthermore, this indicator may be a pre-cursor to the message, an appendix to the message, or incorporated within the message itself. For example, according to the CDMA air interface, there are two attributes, or fields, of an origination message that can be set to identify that message as an international telephone call:

DIGIT_MODE=1B;
NUMBER_TYPE=001B.

One of ordinary skill will recognize that there are many functionally equivalent methods and techniques to mark a message so that the MSN can discover that it pertains to an international call and such alternatives are contemplated within the scope of the present invention. However, utilizing techniques that satisfy the existing standards for describing the CDMA air interface, such as using the fields mentioned above, will allow the use of devices and systems that already comport with these standards.

In step 306, the MSN retrieves the appropriate international prefix from a stored location when it is determined that the origination message is for an international call. Because the MSN is a fixed system, the international prefix does not vary and can be pre-stored for use when needed. In step 308, the MSN generates a translated call origination message that is formatted according to the core network. In particular, the call origination message that is passed to the core network includes the correct international prefix for the international call. The core network treats the message from the MSN as any standard call origination message and will then operate accordingly to complete the call, as is well known in the art.

Figure 4:
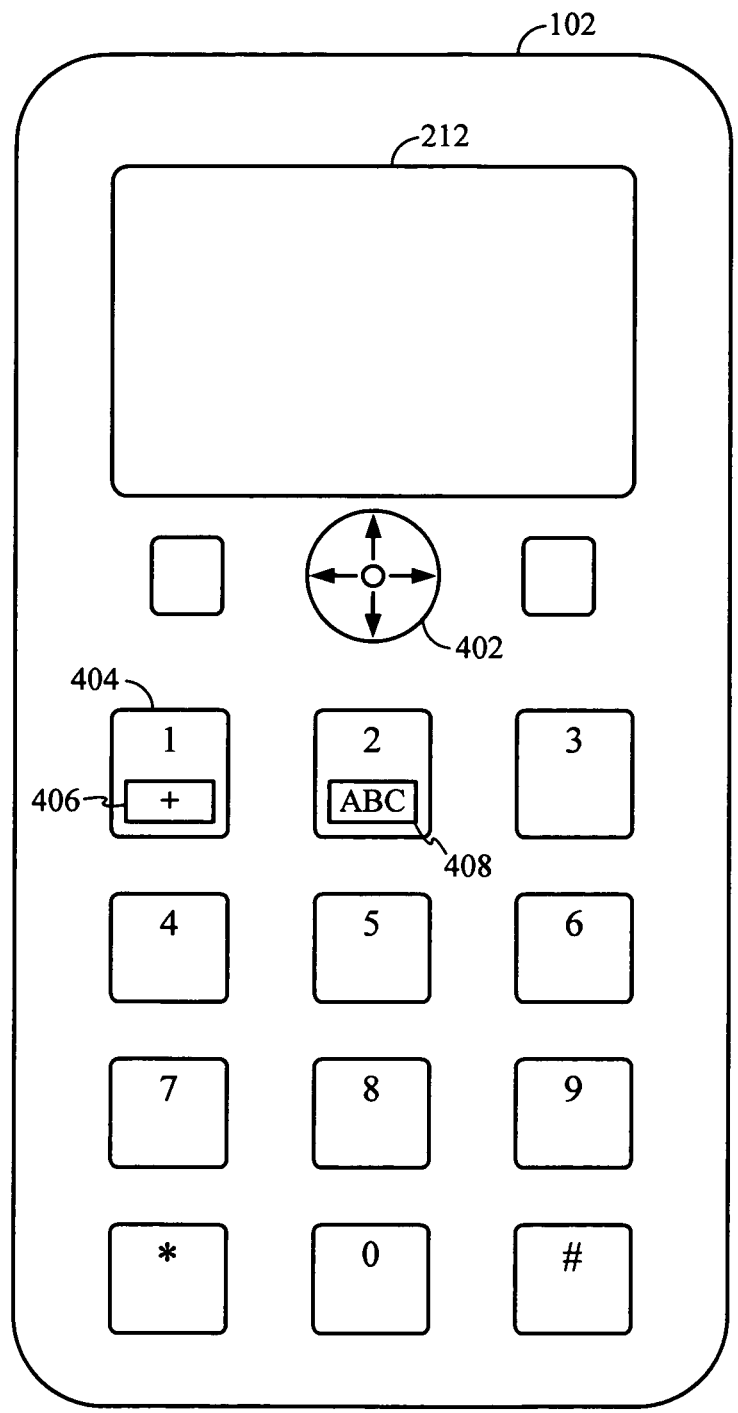
FIG. 4 is a flow diagram illustrating the functionality of assigning a slot index to a mobile device in accordance with the principles of the present invention.

FIG. 4 depicts an exemplary user interface for a mobile communications device such as 102, 250, 252 in accordance with the principles of the present invention. Within the method described in FIG. 3, a call origination message is received by the MSN that includes some indicator of being an international call. The user interface of FIG. 4 provides one exemplary technique for the user to inform the mobile communications device 102 that the call is intended to be an international call so that the device 102 can properly format the call origination message as expected by the MSN.

The interface of the device 102 includes a display 212 that typically displays menus of selections or information about an incoming or outgoing call. One or more keys 402 are provided for navigating through the information on the display 212. As typical with a mobile communications device 102, a keypad is provided that has one or more keys 404 associated with the ten numerals that are used in telephone numbers. The keys usually include a region 408 that displays aliases for these keys 404 that refer to alternative, alphanumeric data associated with the keys.

Many different ways are presently used so that the data generated by selecting a key 404 is either the associated numeral or one of the associated aliases. Some keys do not have alphanumeric characters associated therewith on a standard keypad. For example, on many CDMA telephones the "1" key 404 includes a region 406 that is blank. Accordingly, this key 404 can easily be assigned an alias that represents an input element for indicating that a telephone number being input is an international call. In the example of FIG. 4, the symbol "+" is used. One of ordinary skill will readily recognize that other symbols may be used as well without departing from the scope of the present invention.

According to such an interface, a user enter a telephone number without worrying about the international prefix. Either before or after entering the number, the user would also select the "+" symbol (or some other appropriate symbol). In this way, the input received by the user via the interface alerts the mobile communications device that the telephone number entered refers to an international telephone call. When the user elects to initiate the call, the mobile communications device parses the telephone number to create the call origination message, as is known in the art. However, in accordance with the principles described herein part of this parsing process includes determining whether the "+" (or other symbol) is present so that the call origination message can be altered to indicate an international telephone call.

Figure 5:
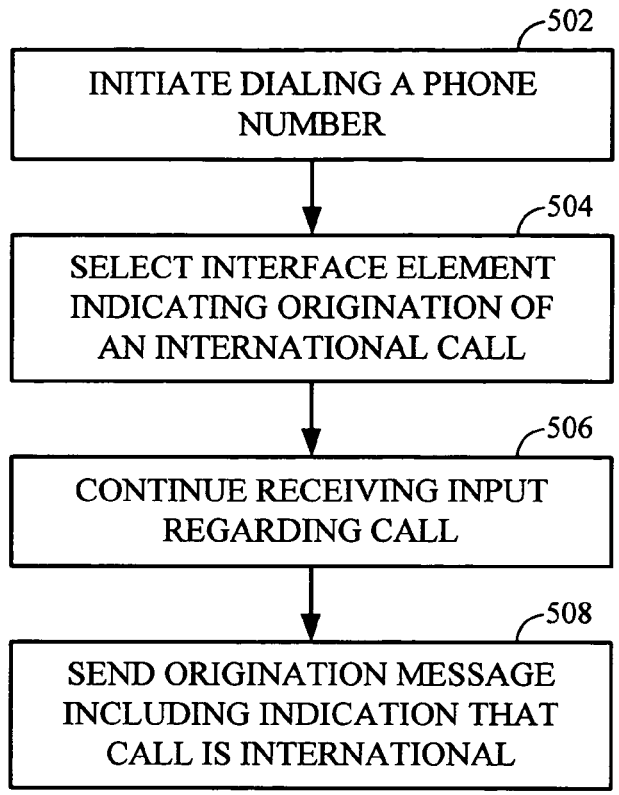
FIG. 5 depicts a flowchart of an exemplary method to originate an international call message from a CDMA-based mobile communications device.

The flowchart of FIG. 5 depicts an exemplary method for such an sequence of events. In step 502, the user initiates dialing a telephone number as usual. However, as part of entering the telephone number, the user selects, in step 504, the interface symbol that indicates the telephone call is an international call. Once all the telephone call information is received to initiate the call, in step 506, the mobile communications device generates, in step 508, a call origination message. In particular, the call origination message is formatted according to a particular air interface standard and includes an indicator that the telephone call is an international call. Of course, if the user does not select the interface symbol for an international call in step 504, then the call origination message does not include an indicator that the call is an international telephone call.

Figure 6:
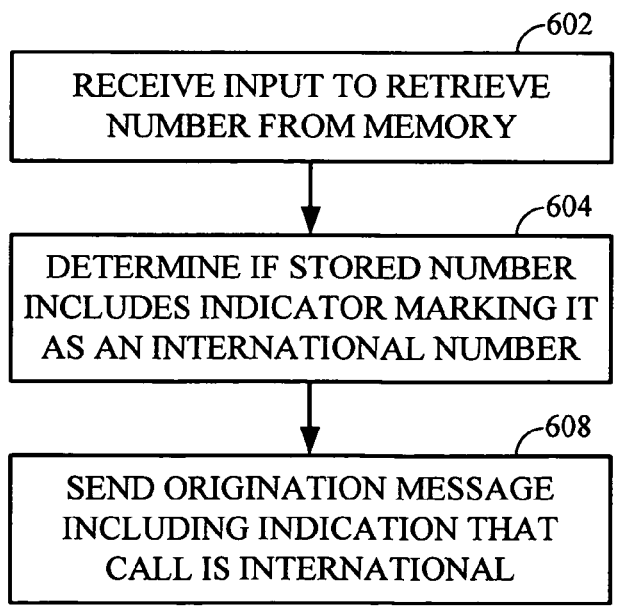
FIG. 6 depicts a flowchart of an exemplary method to originate an international call message from a stored telephone number in a CDMA-based mobile communications device.

In many communication devices, telephone numbers for multiple contacts are often stored in memory for easy access. For example, a GSM SIM can store hundreds of telephone numbers with multiple labels (e.g., name, type of contact, type of device, etc.). In such instances where a user merely selects a telephone number or contact from a stored memory, the user may not have the opportunity to indicate that the telephone number relates to an international telephone call. Accordingly, an exemplary method is described with respect to the flowchart of FIG. 6 that provides functionality similar to that of the method of FIG. 5 but in instances where the number is retrieved from a memory.

In step 602, a user utilizes the user interface of the mobile communications device to retrieve a number stored in memory. The mobile communications device then determines, in step 604, if the retrieved stored number includes an indicator that the number is associated with an international telephone number. Typically, the retrieved number is then displayed on the interface screen and the user selects a "send" or "enter" input to initiate the call. If the telephone number is determined to be an international telephone number, then the call origination message generated by the mobile communications device is sent, in step 608, and includes an indication that the telephone call is an international call. The steps 508 and 608 of the two methods may be substantially similar.

In one exemplary method, when the mobile communications device determines that the stored number that was retrieved is an international telephone number, the "+" (or other symbol) is displayed on the user interface to indicate that the retrieved number is an international telephone number. Thus, regardless of whether the user manually inputted the symbol or the retrieval process automatically inserted it, the resulting telephone number would include the symbol and the mobile communications device could use the same routine, in either case, to generate an appropriate call origination message.

For example, according to the typical GSM SIM standards, a number may be stored with the TON flag set to TON=001B. Thus, when a number is retrieved from the SIM, that flag could be tested to determine if a "+" (or other symbol) should be added to the retrieved number. Alternatively, the number, when created by the user for storage, may explicitly include the "+" (or other symbol) because the user manually added it. In either case, the displayed number, once retrieved, will include the appropriate, additional symbol. It is unnecessary to worry about instances where a number that is usually an international number may be incorrectly identified as an international number when the user is temporarily visiting that locale. Most core networks include sufficient logic to recognize that a call origination message having the international prefix of the local region can be connected without actually using the international prefix when making the connection.

While a particular exemplary architecture was described above that specifically referred to a network architecture having an air interface different than a core network, the particular methods and techniques described herein will also operate within a standard CDMA network that includes a modified Mobile Switching Center (MSC) that performs some of the functionality of the earlier-described MSN with respect to FIG. 3. In particular, the MSC, not the MSN, will receive a call origination message and determine whether it includes an indicator that it is an international telephone call. The MSC will also generate a new call origination message that has inserted therein the appropriate international prefix. However, rather than the newly generated call origination message being in a GSM format, it will remain in the CDMA format. Thus, using both a CDMA air interface and a CDMA core network, an international telephone call may be placed without the user being aware of the correct international prefix to use.

A number of variations to the specific behaviors and steps described in the above examples may be made without departing from the scope of the present invention. The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A telecommunications system, comprising:
a first interface at a network switching node configured to receive a first call origination message from a mobile communication device, wherein the first interface comprises a code division multiple access (CDMA) air interface, wherein the first call origination message comprises a request for a call according to a CDMA air interface format, including a telephone number and a separate identifier comprising a DIGIT_MODE field or a NUMBER_TYPE field, wherein the separate identifier indicates an absence of a required international prefix, and wherein the separate identifier is formatted according to the CDMA format and is generated by the mobile communication device based on a received indicator having a Global System for Mobile Communications (GSM) format;
a message translator configured to:
identify the separate identifier associated with the first call origination message;
retrieve, in response to identifying the separate identifier, an international prefix corresponding to a location of the network switching node; and
translate, at the network switching node, the first call origination message according to the CDMA air interface format to a second call origination message requesting the call according to a core network interface format comprising the GSM format, wherein the second call origination message includes the telephone number and the international prefix formatted according to the GSM format; and a second interface, comprising the GSM communication interface, configured to transmit the second call origination message from the network switching node to the core network according to a core network format for completing the requested call.

2. The telecommunications system of claim 1, wherein the core network comprises a GSM core network.

3. The telecommunications system of claim 1, wherein the identifier comprises at least one field within the first call origination message having a particular, respective value.

4. The telecommunications system of claim 1, further comprising:
a memory configured to store the international prefix; and
wherein the message translator is further configured to retrieve the international prefix from the memory and insert the international prefix within the second call message.

5. The telecommunications system of claim 1, further comprising:
a processor and associated memory; and
wherein the message translator further comprises a software application stored within the associated memory and executable by the processor.

6. A mobile communications device, comprising:
a user interface configured to accept input requesting a call related to a telephone number, the user interface comprising an input element selectable by a user to indicate the telephone number is an international telephone number, wherein selection of the input element adds an international telephone number indicator according to a Global System for Mobile Communications (GSM) core network format to the input, wherein the international telephone number indicator represents an absence of a required international prefix;
a message generator configured to generate a message according to a CDMA format of a code division multiple access (CDMA) air interface based on the input, the message generator further configured to include the telephone number and a separate international telephone number identifier comprising a DIGIT_MODE field or a NUMBER_TYPE field, wherein the separate international telephone number identifier indicates the absence of the required international prefix in the message, wherein the separate international telephone number identifier is formatted according to the CDMA air interface and is based on the separate international telephone number indicator having the GSM core network format, wherein the international telephone number identifier is operable to trigger a network switching node operable to communicate with both the CDMA air interface and the GSM core network to add the required international prefix and to reformat the message into a format of the GSM core network, wherein the required international prefix corresponds to a location of the network switching node; and
a first transceiver configured to transmit the message over the CDMA air interface to the network switching node.

7. The mobile communications device of claim 6, wherein the network switching node is connected to the GSM core network.

8. The mobile communications device of claim 6, wherein the international telephone number indicator comprises an individual symbol.

9. The mobile communications device of claim 6, wherein the message generator further comprises:

a symbol detector configured to determine if the input includes the international telephone number indicator; and a message formatter configured to provide the international telephone number identifier by setting a value of one or more fields of the message to a predetermined value if the input includes the international telephone number indicator.

10. The mobile communications device of claim 6, wherein the message is a call origination message.

11. A method for handling international calls comprising:
receiving a first call origination message via a code division multiple access (CDMA) air interface at a network switching node from a mobile communication device, wherein the first call origination message comprises a request for a call according to a CDMA air interface format, including a telephone number and a separate identifier comprising a DIGIT_MODE field or a NUMBER_TYPE field, wherein the separate identifier indicates an absence of a required international prefix, and wherein the separate identifier is formatted according to the CDMA format and is generated by the mobile communication device based on a received indicator having a Global System for Mobile Communications (GSM) core network format and corresponding to the telephone number;
determining if the first call origination message includes the separate identifier;
identifying the international prefix corresponding to the separate identifier, wherein the international prefix corresponds to a location of the network switching node; and
generating, at the network switching node, a second call origination message requesting the call in the GSM core network format for transmission to a core network, wherein the second call origination message includes the international prefix formatted according to the GSM format and the telephone number.

12. The method of claim 11, wherein the core network format is compatible with a GSM core network.

13. The method of claim 11, wherein the identifier comprises one or more fields within the first call origination message having a respective value.

14. The method of claim 11, wherein generating the second call origination message further comprises:
retrieving the international prefix from a memory store; and
inserting the international prefix within the second call origination message.

15. A method for initiating an international telephone call, comprising:
receiving, via a user interface of a communication device configured to communicate with a Global System for Mobile Communications (GSM) core network via a code division multiple access (CDMA) air interface, input requesting a call related to a telephone number;
receiving, via the user interface, an input element according to a GSM format that indicates the telephone number is an international call and represents an absence of a required international prefix;
generating, at the communication device, a call origination message requesting the call formatted according to a CDMA air interface format that, based on the input element, includes the telephone number and a separate identifier comprising a DIGIT_MODE field or a NUMBER_TYPE field, wherein the separate identifier indicates the absence of the required international prefix, wherein the separate identifier is formatted according to the CDMA air interface and is based on the input element having the GSM format, wherein the separate identifier triggers a network switching node operable to communicate with both the CDMA air interface and the GSM core network to add the required international prefix and to reformat the call origination message into a format of the GSM core network, wherein the international prefix corresponds to a location of the network switching node; and
transmitting the call origination message to the network switching node over the CDMA air interface.

16. The method of claim 15, wherein the input element comprises an individual symbol selectable via the user interface.

17. The method of claim 15, wherein generating the call origination message further comprises:
setting a respective value of one or more fields in the call origination message to a respective predetermined value.

18. A mobile communications device, comprising:
a memory configured to store a plurality of telephone numbers and a respective setting associated with each of the plurality of telephone numbers, wherein each respective setting has a Global System for Mobile Communications (GSM) format and indicates whether its associated telephone number is an international telephone number;
a user interface configured to request a call by selecting one of the plurality of telephone numbers;
a message generator configured to generate a message requesting the call according to a code division multiple access (CDMA) air interface format based on the selected one of the plurality of telephone numbers, the message generator further configured to include a separate identifier comprising a DIGIT_MODE field or a NUMBER_TYPE field, wherein the separate identifier is formatted according to the CDMA air interface and is based on the respective setting having the GSM format, wherein the separate identifier indicates an absence of a required international prefix within the message if the respective setting indicates the selected one of the plurality of telephone numbers is an international telephone number, wherein the separate identifier is operable to trigger a network switching node that is configured to communicate with both the CDMA air interface and the GSM core network to add the required international prefix and to reformat the message into a format of the GSM core network, wherein the required international prefix corresponds to a location of the network switching node; and
a first transceiver further configured to transmit the message to the network switching node over the CDMA air interface.

19. The mobile communications device of claim 6, wherein the international telephone number indicator comprises a non-numeric symbol, and wherein the international telephone number identifier comprises a numeric value.

20. The method of claim 15, wherein receiving the input element further comprises receiving a non-numeric symbol, and wherein generating the call origination message further comprises generating the indicator comprising a numeric value.

21. An apparatus for initiating an international telephone call, comprising:
means for receiving input requesting a call related to a telephone number;

means for receiving an input international indicator according to a Global System for Mobile Communications (GSM) format that represents an international prefix;

means for generating a call origination message requesting the call that, based on the input international indicator, includes the telephone number and a separate identifier comprising a DIGIT_MODE field or a NUMBER_TYPE field, wherein the separate identifier indicates an absence of a required international prefix, wherein the separate identifier is formatted according to a code division multiple access (CDMA) air interface and is based on the input international indicator having the GSM format, said call origination message formatted according to the CDMA air interface format, wherein the separate identifier is operable to trigger a network switching node operable to communicate with both an air interface and a core network to add the international prefix and to reformat the call origination message into the GSM format of the GSM core network, wherein the international prefix corresponds to a location of the network switching node; and means for transmitting the call origination message to the network switching node via the CDMA air interface.

22. At least one processor for initiating an international telephone call, comprising:
a first module for receiving, via a user interface, input requesting a call related to a telephone number;
a second module for receiving, via the user interface, an input element according to a Global System for Mobile Communications (GSM) core network format that indicates the telephone number is an international call, wherein the input element represents an absence of a required international prefix;
a third module for generating a call origination message requesting the call that, based on the input element, includes the telephone number and a separate identifier comprising a DIGIT_MODE field or a NUMBER_TYPE field, wherein the separate identifier indicates an absence of a required international prefix, wherein the separate identifier is formatted according to a code division multiple access (CDMA) air interface and is based on the input element having the GSM core network format, said call origination message formatted according to the CDMA air interface format, wherein the separate identifier is operable to trigger a network switching node operable to communicate with both the CDMA air interface and the GSM core network to add the required international prefix and to reformat the call origination message into the GSM format of the GSM core network, wherein the required international prefix corresponds to a location of the network switching node; and
a fourth module for transmitting the call origination message to the network switching node via the CDMA air interface.

23. A computer product for initiating an international telephone call, comprising:
a non-transitory computer-readable medium, comprising:
a first executable software operable to cause a computer to receive, via a user interface of a communication device, input requesting a call related to a telephone number;
a second executable software operable to cause the computer to receive, via the user interface, an input element according to a Global System for Mobile Communications (GSM) format that indicates the telephone number is an international call, wherein the input element represents an absence of a required international prefix;
a third executable software operable to cause the computer to generate, at the communication device, a call origination message requesting the call that, based on the input element, includes the telephone number and a separate identifier comprising a DIGIT_MODE field or a NUMBER_TYPE field, wherein the separate identifier indicates an absence of a required international prefix, wherein the separate identifier is formatted according to a code division multiple access (CDMA) air interface and is based on the input element having the GSM format, said call origination message formatted according to the CDMA air interface format, wherein the separate identifier is operable to trigger a network switching node operable to communicate with both the CDMA air interface and a core network to add the required international prefix and to reformat the call origination message into the GSM format of the GSM core network, wherein the required international prefix corresponds to a location of the network switching node; and
a fourth executable software operable to cause the computer to transmit the call origination message to the network switching node via the CDMA air interface.

24. An apparatus for handling international calls, comprising:
means for receiving a first call origination message via a code division multiple access (CDMA) air interface at a network switching node from a mobile communication device, wherein the first call origination message comprises a request for a call in a CDMA air interface format, wherein the first call message is generated by the mobile communications device and comprises a telephone number and a separate identifier comprising a DIGIT_MODE field or a NUMBER_TYPE field, wherein the separate identifier indicates an absence of a required international prefix, and wherein the separate identifier is formatted according to the CDMA air interface and is generated by the mobile communications device based on an indicator according to a Global System for Mobile Communications (GSM) format corresponding to the telephone number;
means for determining if the call origination message includes the separate identifier;
means for generating, at the network switching node, a second call origination message requesting the call in a core network format, wherein the second call origination message includes the required international prefix and the telephone number if the first call origination message includes the separate identifier, wherein the required international prefix corresponds to a location of the network switching node: and
means for transmitting the second call origination message to the core network for completing the requested call.

25. At least one processor for handling international calls, comprising:
a first module for receiving a first call origination message via a code division multiple access (CDMA) air interface at a network switching node from a mobile communication device, wherein the first call origination message comprises a request for a call in a CDMA air interface format, wherein the first call origination message is generated by the mobile communications device and comprises a telephone number and a separate identifier comprising a DIGIT_MODE field or a NUMBER- TYPE field, wherein the separate identifier indicates an absence of a required international prefix, and wherein the separate identifier is formatted according, to the CDMA air interface and is generated by the mobile communications device based on indicator according to a Global System for Mobile Communications (GSM) format corresponding to the telephone number;

a second module for determining if the call origination message includes the separate identifier;

a third module for generating, at the network switching node, a second call origination message requesting the call in a core network format, wherein the second call origination message includes the required international prefix and the telephone number if the first call origination message includes the separate identifier, wherein the required international prefix corresponds to a location of the network switching node; and a fourth module for transmitting the second call origination message to the core network for completing the requested call.

26. A computer product for handling international calls, comprising:

a non-transitory computer-readable medium, comprising:

a first executable software operable to cause a computer to receive a first call origination message via a code division multiple access (CDMA) air interface at a network switching node from a mobile communication device, wherein the first call origination message comprises a request for a call according to a CDMA air interface format, wherein the first call message is generated by the mobile communications device and comprises a telephone number and a separate identifier comprising a DIGIT_MODE field or a NUMBER_TYPE field, wherein the separate identifier indicates an absence of a required international prefix, and wherein the separate identifier is formatted according to the CDMA air interface and is generated by the mobile communications device based on indicator according to a Global System for Mobile Communications (GSM) format corresponding to the telephone number;

a second executable software operable to cause the computer to determine if the call origination message includes the separate identifier;

a third executable software operable to cause the computer to generate, at the network switching node, a second call origination message requesting the call in a core network format, wherein the second call origination message includes the required international prefix and the telephone number if the first call origination message includes the separate identifier, wherein the required international prefix corresponds to a location of the network switching node; and a fourth executable software operable to cause the computer to transmit the second call origination message to the core network for completing the requested call.

27. The telecommunications system of claim 1, wherein the identifier is different from the indicator.

28. The mobile communications device of claim 6, wherein the international telephone number identifier is different from the international telephone number indicator.

29. The method of claim 11, wherein the identifier is different from the indicator.

30. The method of claim 15, wherein the identifier is different from the input element.

31. The mobile communications device of claim 18, wherein the identifier is different from the respective setting.

32. The telecommunications system of claim 1, wherein the identifier is a precursor to the first call origination message.

33. The mobile communications device of claim 6, wherein the international telephone number identifier is a precursor to the message.

34. The method of claim 11, wherein the identifier is a precursor to the first call origination message.

35. The method of claim 15, wherein the identifier is a precursor to the call origination message.

36. The mobile communications device of claim 18, wherein the identifier is a precursor to the message.

37. The telecommunications system of claim 1, wherein the identifier is removed from the first call origination message when the first call origination message is translated to the second call origination message.

38. The mobile communications device of claim 6, wherein the international telephone number identifier is removed from the message when the message is reformatted by the network switching node into the format of the GSM core network.

39. The method of claim 11, wherein the generating the second call origination message comprises translating the first call origination message into the second call origination message, and wherein the identifier is removed from the first call origination message when translating the first call origination message into the second call origination message.

40. The method of claim 15, wherein the identifier is removed from the call origination message when the call origination message is reformatted by the network switching node into the format of the GSM core network.

41. The mobile communications device of claim 18, wherein the message is translated at the network switching node into a format of the GSM core network, and wherein the identifier is removed from the message when the message is translated at the network switching node into the format of the GSM core network.

42. The telecommunications system of claim 1, wherein the network switching node is configured to translate the first call origination message to the second call origination message independent of the mobile communication device.

43. The mobile communications device of claim 6, wherein the network switching node is configured to reformat the message into the format of the GSM core network independent of the mobile communication device.

44. The method of claim 11, wherein the network switching node is configured to generate the second call origination message independent of the mobile communication device.

45. The method of claim 15, wherein the network switching node is configured to reformat the call origination message into the format of the GSM core network independent of the communication device.

46. The mobile communications device of claim 18, wherein the network switching node is configured to reformat the message into the format of the GSM core network independent of the mobile communication device.

47. The telecommunications system of claim 1, wherein the location of the network switching node comprises a fixed location.

* * * * *